United States Patent
Zhang et al.

(10) Patent No.: US 12,061,078 B2
(45) Date of Patent: Aug. 13, 2024

(54) ON-MACHINE INSPECTION AND COMPENSATION METHOD EMPLOYING POINT CLOUDS AND APPLIED TO COMPLEX SURFACE PROCESSING

(71) Applicant: EAST CHINA UNIVERSITY OF SCIENCE AND TECHNOLOGY, Shanghai (CN)

(72) Inventors: Xiancheng Zhang, Shanghai (CN); Shuang Liu, Shanghai (CN); Shulei Yao, Shanghai (CN); Xumin Zhu, Shanghai (CN); Kaiming Zhang, Shanghai (CN); Yixin Liu, Shanghai (CN); Yunfei Jia, Shanghai (CN); Shantung Tu, Shanghai (CN)

(73) Assignee: EAST CHINA UNIVERSITY OF SCIENCE AND TECHNOLOGY (CN)

( * ) Notice: Subject to any disclaimer, the term of this patent is extended or adjusted under 35 U.S.C. 154(b) by 632 days.

(21) Appl. No.: 17/312,543

(22) PCT Filed: Mar. 28, 2019

(86) PCT No.: PCT/CN2019/080138
§ 371 (c)(1),
(2) Date: Jun. 10, 2021

(87) PCT Pub. No.: WO2020/118970
PCT Pub. Date: Jun. 18, 2020

(65) Prior Publication Data
US 2022/0057194 A1 Feb. 24, 2022

(30) Foreign Application Priority Data
Dec. 10, 2018 (CN) .......................... 201811505485.4

(51) Int. Cl.
*G01B 11/24* (2006.01)
*B23Q 17/09* (2006.01)
(Continued)

(52) U.S. Cl.
CPC ............ *G01B 11/24* (2013.01); *B23Q 17/098* (2013.01); *B23Q 17/2457* (2013.01); *G01B 11/002* (2013.01)

(58) Field of Classification Search
CPC .... G01B 11/24; G01B 11/002; B23Q 17/098; B23Q 17/2457
See application file for complete search history.

(56) References Cited

U.S. PATENT DOCUMENTS 10,203,368 B2 * 2/2019 Sinanoglu ...... G01R 31/318575
10,395,372 B2 * 8/2019 Anand ...................... G06T 7/11
(Continued)

FOREIGN PATENT DOCUMENTS

CN 103630085 A 3/2014
CN 104392488 A 3/2015
(Continued)

*Primary Examiner* — Elias Desta
(74) *Attorney, Agent, or Firm* — Endurance Law Group PLC

(57) ABSTRACT

The present application provides an on-machine point cloud detection and compensation method for processing complex surfaces, which comprises: step S1, installing a detecting and scanning actuator on an ultrasonic rolling machine tool; step S2, installing a processed workpiece on the chuck which is scanned by the detecting and scanning actuator to obtain the point cloud data of the workpiece in a coordinate system of detecting and scanning actuator, which is converted into the point cloud data of the workpiece in a coordinate system of machine tool; step S3, processing the point cloud data of the workpiece in the coordinate system of machine tool; step S4, obtaining and compensating the shape error feature of the workpiece according to theoretical (Continued)

design data of the processed workpiece and processed point cloud data of the workpiece in the coordinate system of machine tool. The accuracy and efficiency of complex surface strengthening is improved in the present application.

9 Claims, 4 Drawing Sheets

(51) Int. Cl.
  *B23Q 17/24* (2006.01)
  *G01B 11/00* (2006.01)

(56) References Cited

U.S. PATENT DOCUMENTS

| | | | |
|---|---|---|---|
| 10,963,657 B2* | 3/2021 | Rodriguez | G06V 10/464 |
| 2010/0079769 A1 | 4/2010 | Chen et al. | |

FOREIGN PATENT DOCUMENTS

| | | |
|---|---|---|
| CN | 105157609 A | 12/2015 |
| CN | 105737762 A | 7/2016 |
| CN | 107246849 A | 10/2017 |
| CN | 109489580 A | 3/2019 |
| WO | 2016020175 A1 | 2/2016 |

\* cited by examiner

ON-MACHINE INSPECTION AND COMPENSATION METHOD EMPLOYING POINT CLOUDS AND APPLIED TO COMPLEX SURFACE PROCESSING

FIELD OF THE INVENTION

The present application relates to an on-machine point cloud detection and compensation method for processing complex surfaces.

BACKGROUND OF THE INVENTION

In the process of strengthening the surface of a workpiece with complex curved surface, such as the blade surface of an aircraft engine, it is found that there is a certain deviation between the blade area strengthened by ultrasonic rolling machine tool and the planned processing area, because the shape and size error of blade processing, the comprehensive error of machine tool and the chuck installation error result in that the actual shape and position of the blades are different from those of the model used in the planning Therefore, in the process of surface strengthening, the machining path planned based on the complex surface design model often causes machining errors, that is to say, there are errors between the strengthened complex surface area and the target area, which requires to manually adjust the parameters and correct the machining path, such that the machining errors are compensated. However, since the error of each complex surface workpiece is different, it usually needs to suspend the equipment in the actual processing and adjust the compensation parameters, which greatly reduces the processing efficiency and increases the manufacturing cost. Moreover, manual adjustment requires high experience and is very difficult, and the precision control is difficult.

To this end, the conventional detection equipments (such as coordinate measuring machine, automatic drawing measuring instrument, etc.) are usually used to measure the complex surfaces of the workpieces in the prior art, i.e., the coordinate data of discrete points on the complex surfaces are obtained by the detection equipment to realize the evaluation of the surfaces. Based on the above conventional equipments, the existing measuring methods of complex surface workpieces mainly include: standard template method, automatic drawing measuring method, optical projection measuring method, coordinate measuring method and inductance measuring method, wherein, standard template method is a qualitative measuring method, which can only judge whether the parts are qualified or not by experience, and cannot figure out the size of the actual error of a workpiece. Although the measurement accuracy of the automatic drawing measuring method is higher than that of the standard template method, it still cannot meet the needs of high-precision blade detection, and the volume of the automatic drawing measurement instrument is large and the operation is inconvenient, so its application scope is limited. The optical projection measuring method is generally used for qualitative detection, which can directly determine whether the blade is qualified or not by observing the coincidence degree between the actual blade profile and the theoretical blade profile. However, the efficiency of quantitative measurement by reading coordinate values is relatively low, and the measurement range is limited due to the limitation of its own display screen. Moreover, the optical projection measuring method is greatly affected by the reflection ability of the surfaces of the workpieces, and its measurement accuracy is low. As a kind of general point measuring method, the equipment of coordinate measuring method has the disadvantages of high cost, complicated measuring process, and low measuring efficiency, requirements of secondary development of measuring software and high environmental standards. The inductance measuring method belongs to the incomplete contour detection, which makes the measuring results not very reliable and has the possibility of misjudgment. Moreover, different workpieces need to be equipped with corresponding support devices and standard workpieces, which increases the measuring cost and time.

In recent years, the development of the optical measuring technology provides new measuring methods for measuring complex surface. The advanced complex surface shape detection equipments, such as metal surface defect detector; 3D scanners (including laser 3D scanners and structured light 3D scanners) can be used to realize the accurate detection and error evaluation of the surfaces of workpieces. Based on the above advanced detection equipments, the new measuring methods mainly comprise: machine vision measuring method, four coordinate laser measuring method and laser scanning measuring method. The advantages of these measuring methods lie in fast measuring speed, large range and high efficiency.

However, the above existing and improved detection methods usually require the workpieces to be installed on the detection platform, which causes the errors bought by the second loading and unloading.

In order to detect and compensate the errors in the process of machining, it is necessary to integrate the detection and machining into a "machining-integration" system. Therefore, the on-machine detection for machining center has also been widely used. Many foreign companies have studied this aspect, and developed on-machine detection systems which meet their needs for various manufacturing equipments. For example, the various measuring heads and corresponding softwares arranged in the machining center specially developed by Reni Shaw Company in the UK can realize the functions of tool detection, tool breakage detection, workpiece error detection and so on. On-machine gear measuring device of gear grinding machine of Kapp Company in Germany. The famous gear machine tool manufacturers Grison Company and Klingember Company connect the gear detection center with the machining machine tool, and realize the closed-loop manufacturing of gear CAD/CAM/CAI. The general detection system Power Inspect of Delcam company in the UK can realize both on-machine and off-machine detection. Domestic scholars have also carried out the exploration and research in the field of on-machine detection technology. The related research mainly includes: the error comprehensive modeling of machine tool, the measurement and identification of error parameters, the automatic planning of the detection paths of workpieces, and the compensation technology for different error sources. However, the existing error compensation methods, such as multiple compensation methods based on anti-deformation errors, have the disadvantages of low efficiency of error compensation and so on.

In the research and development of on-machine detection equipments, the contact detection probe or the non-contact detection probe based on optical principle can be selected. Wherein the contact detection probe directly contacts with the object to be measured, which triggers the probe sensor to send the measurement signal, and to receive the signal from the sensor, and to determine the current spherical center coordinate of the probe, and the coordinate value of the point is finally calculated through the probe radius compensation and error compensation. It has the characteristics of high precision and strong environmental adaptability, but it has the disadvantages of low detection efficiency and high detection cost. The non-contact detection probe uses optical and other physical properties to reverse the shape information of the object. Compared with the contact detection method, the non-contact detection method has the characteristics of fast scanning speed, and can obtain the overall contour of the measured workpiece, and can measure the workpieces with soft surface, The non-contact detection method has high accuracy, up to 0.01 mm, but it is also vulnerable to the reflection characteristics (such as curvature, color, roughness, etc.) of the surfaces of workpieces.

For freeform surfaces such as aviation thin-walled blades, repeated measurements are usually required, which results in the scale of the point clouds measurement reaching the level of 100,000/1,000,000. More seriously, due to the influence of temperature difference, dust particles, micro vibration and other factors in the industrial field, the point clouds measurement have inherent defects (residual noise, external holes, stacking area, density difference, etc.). The resulting processing of large-scale point cloud data becomes one of the key problems of complex surface detection, such as the geometric operations of simplification, smoothing, merging and reconstruction. Specifically, since the thicknesses of the leading and trailing edge areas of the aviation blades are less than 2 mm, the data of the leading and trailing edges are easily lost in the conventional simplification or fairing process. Due to the non-uniform distribution of the point clouds of the blade themselves, the sparse point clouds should be reserved in the sparse area of the point cloud distribution in the process of simplification, otherwise it will cause holes. In addition, it is necessary to avoid the loss of high curvature features caused by over smoothing.

Thus, in order to improve the efficiency and accuracy of surface strengthening processing of complex surface workpieces, it is necessary to develop a fast and efficient detection technology that can be carried out in the on-machine machining station of complex surface workpieces, as well as an efficient method to compensate the surface strengthening error.

SUMMARY OF THE INVENTION

In order to solve the existing problems in the prior art, the purpose of the present application is to provide anon-machine point cloud detection and compensation method for processing complex surfaces, so as to efficiently and quickly detect and compensate errors on machine in the process of ultrasonic rolling strengthening machining.

The on-machine point cloud detection and compensation method for processing complex surfaces of the present application comprises the following steps:

Step S1, installing a detecting and scanning actuator on an ultrasonic rolling machine tool, wherein, the ultrasonic rolling machine tool comprises: a chuck and two machining heads respectively installed on left and right sides of the chuck; the detecting and scanning actuator comprises two detecting scanners respectively installed on the machining heads;

Step S2, scanning a processed workpiece installed on the chuck by the detecting and scanning actuator to obtain point cloud data of the workpiece in a coordinate system of the detecting and scanning actuator; converting the point cloud data of the workpiece in the coordinate system of the detecting and scanning actuator into the point cloud data of the workpiece in a coordinate system of machine tool;

Step S3: processing the point cloud data of the workpiece in the coordinate system of machine tool;

Step S4: obtaining and compensating a shape error feature of the workpiece according to theoretical design data of the processed workpiece and the processed point cloud data of the workpiece in the coordinate system of machine tool;

Wherein, the Step S3 comprises:

Step S31, removing external noise points from the point cloud data of the workpiece in the coordinate system of machine tool by means of a main point cloud cluster extraction method, so as to obtain the original point cloud data of a blade model;

Step S32, removing the original data noise points from the original point cloud data of the blade model by means of statistical outlier method, so as to obtain denoised point cloud data;

Step S33, simplifying and smoothing the denoised point cloud data by means of bounding box method considering curvature.

In the above on-machine point cloud detection and compensation method for processing complex surfaces, the Step S31 comprises:

Clustering the point cloud data of the workpiece in the coordinate system of machine tool according to density, wherein the point cloud with highest density is main point cloud data of the blade, which is recorded as MP, while the point cloud with low density is recorded as $OP_i$. Distance from $OP_i$ to MP is calculated according to following equation, if the distance exceeds a predetermined threshold $D_\tau$, it means $OP_i$ is the external noise point to be deleted;

$$\text{Dist}(OP_i, MP) = \|OP_i - MP\|.$$

In the above on-machine point cloud detection and compensation method for processing complex surfaces, the Step S32 comprises:

Calculating the average distance $d_{mid}(P_i)$ of distances from each point $P_i$ of the original point cloud of the blade model to all points of neighborhood M according to following equation, if $d_{min}(P_i) > D_{mid}$, point $P_i$ is defined as an outlier, and finally the outlier is deleted, wherein $D_{mid}$ is global average distance of the model;

$$d_{mid}(P_i) = \frac{1}{k} \sum_{j=1}^{k} \|P_i - M_j\|,$$

Wherein k is the number of point cloud in neighborhood M of point $P_i$, $M_j$ is the j-th point in neighborhood M.

In the above on-machine point cloud detection and compensation method for processing complex surfaces, the Step S33 comprises: putting the denoised point cloud data into a cuboid, dividing the cuboid evenly into cubes with equal edges according to a predetermined simplification rate; for each cube, selecting the point cloud data closest to the center of the cube as the feature point, and reducing the edge length of the cube to increase its density for areas with curvature greater than 0.33 in the denoised point cloud data.

In the above on-machine point cloud detection and compensation method for processing complex surfaces, the Step S33 also comprises: calculating the curvature of the denoised point cloud data by means of conicoid fitting method.

In the above on-machine point cloud detection and compensation method for processing complex surfaces, the shape error feature of the workpiece comprises: maximum deviation values in X and Y directions between actual position data on X axis and Y axis of each layer of section of the processed workpiece and design position data on X axis and Y axis of each layer of section of the processed workpiece; the Step S4 comprises: compensating the maximum deviation value in X direction by means of force feedback compensation method, and compensating the maximum deviation value in Y direction by means of increasing or decreasing the trajectory offset of the machining heads in the Y direction.

In the above on-machine point cloud detection and compensation method for processing complex surfaces, the ultrasonic rolling machine tool also comprises: a bed base, the chuck can rotate around Z axis and be movably mounted on the bed base along Z axis.

In the above on-machine point cloud detection and compensation method for processing complex surfaces, the detecting and scanning actuator also comprises: two Y axis lifting mobile worktables installed on the bed base and symmetrically distributed on left and right sides of the processed workpiece, and two X axis left and right mobile worktables respectively installed on the Y axis lifting mobile worktables.

In the above on-machine point cloud detection and compensation method for processing complex surfaces, the detecting scanner is a laser scanner.

Owing to the above technical solution, in order to avoid the detection error caused by the secondary loading and unloading in the detection process of the workpiece with complex surfaces and increase the detection efficiency, the non-contact detection technology is used in the present application to carry out the on-machine detection of the workpiece in the surface strengthening process of the workpiece with complex surfaces, i.e., the surface of the workpiece is scanned in the machining station of the workpiece with complex surfaces and the complex surface shape data is obtained rapidly. The comprehensive error of the shape and position of the complex surface is obtained by means of the large-scale point cloud processing technology. By analyzing the characteristics of the difference between the point cloud data model and the design model, an error compensation scheme based on force feedback and position compensator (i.e., compensation parameters is output to the position compensator of the sub belt of the machine tool) is obtained to compensate the trajectory error. Therefore, the precision and efficiency of surface strengthening machining of complex surface are improved.

BRIEF DESCRIPTION OF THE DRAWINGS

These and other features and advantages of this application will become more apparent to those skilled in the art from the detailed description of preferred embodiment. The drawings that accompany the description are described below.

DESCRIPTION OF THE PREFERRED EMBODIMENTS

The followings are used to further illustrate the present application with specific embodiments. It should be understood that the following embodiments is only used to explain the present application but not to limit the scope of the present application.

Figure 1A:
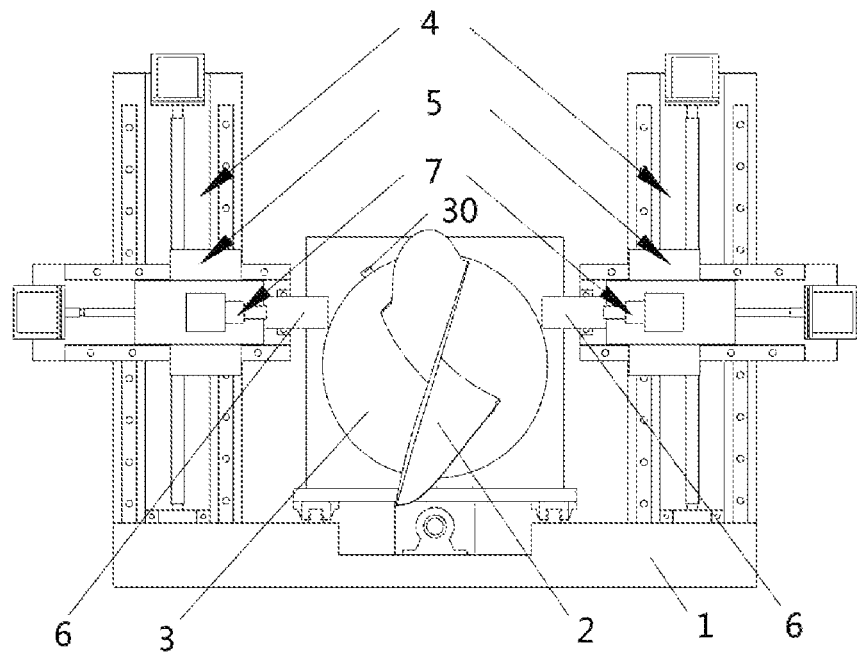
FIG. 1a is a schematic diagram showing a detecting and scanning actuator is installed on an ultrasonic rolling machine tool according to the on-machine point cloud detection and compensation method for processing complex surfaces of the present application.
Figure 1B:
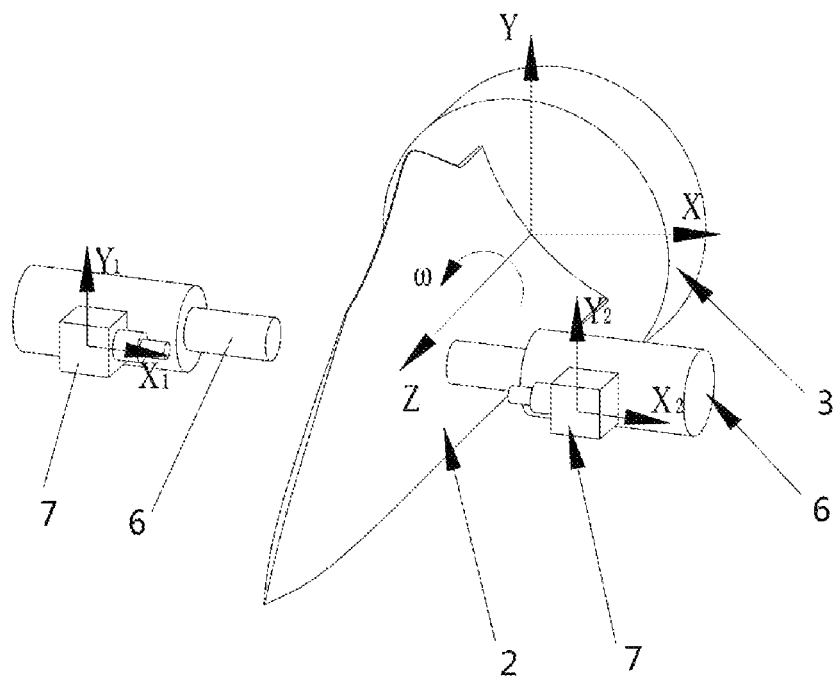
FIG. 1b is a schematic diagram of the processed workpiece, chuck, machining heads and detecting scanner in the present application, showing the X, Y and Z axes directions of movement of the chuck and detecting scanner.

The present application, i.e., an on-machine point cloud detection and compensation method for processing complex surfaces, comprises the following steps:

Step S1, installing a detecting and scanning actuator on an ultrasonic rolling machine tool, wherein, It can be seen from FIGS. 1a-1b that the ultrasonic rolling machine tool includes: a chuck 3 installed on a bed base 1, and a processed workpiece 2 installed on the chuck 3, wherein, the chuck 3 can rotate around Z axis and move along Z axis on the bed base 1, and the end of the processed workpiece 2 is installed on one end face of the chuck 3, i.e., the chuck 3 can drive the processed workpiece 2 to rotate around Z axis and feed along Z axis;

The detecting and scanning actuator includes: two Y axis lifting mobile worktables 4 installed on the bed base 1 and symmetrically distributed on left and right sides of the processed workpiece 2, two X axis left and right mobile worktables 5 respectively installed on the Y axis lifting mobile worktables 4, two machining heads 6 respectively installed on the X axis left and right mobile worktables 5 (the machining heads 6 are inherent parts of the ultrasonic rolling machine tool) and two detecting scanners 7 respectively installed on the machining heads 6, i.e., the Y axis lifting mobile worktables 4 and X axis left and right mobile worktables 5 can drive the detecting scanners 7 to move up and down along the direction of Y axis and move left and right along the direction of X axis;

In the present embodiment, the processed workpiece 1 is an aircraft engine blade (there are many kinds of engine blades, most of which are free-form surfaces, the present application is suitable for double arc, multi arc or S-shaped blades, and the maximum length of the blade body is 1200 mm); due to the influence of the reflection of the blade surface, the laser scanner is finally selected as the detecting scanner 7 to obtain the blade point cloud by analyzing and comparing the point cloud effect generated by using the laser scanner and the structured light scanner to scan the workpiece with complex surface, combined with the cost, size and requirements of the scanners. Specifically, the structured light scanner extracts the 3D data of the object surface by taking pictures, while the laser scanner extracts the 3D data of the object surface by line scanning. For workpieces with the complex curved surfaces, especially the aeroengine blades, the metal surfaces luster and are reflective, which will seriously affect the effect of the structure light scanner obtaining the point cloud, and the laser scanner can avoid this problem. Moreover, the point cloud obtained by laser scanner is more accurate than that obtained by structured light scanner, that is to say, the quality of point cloud data is high. In addition, the laser scanner is more portable than the structured light scanner, and can perform non dead angle scanning at any angle at the operation site. In the present embodiment, the laser scanner has a size of about 20 mm*30 mm*10, and its working features are: fixed automatic scanning, high efficiency, and high precision and high resolution.

Step S2, scanning the processed workpiece 2 to obtain the point cloud data of the workpiece in the coordinate system of detecting and scanning actuator by means of the detecting and scanning actuator, i.e., the up and down movements along the direction of Y axis and the left and right movements along the direction of X axis of the detecting scanners combined with the feed along the direction of Z axis and the rotation around Z axis of the chuck 3, and converting the point cloud data of the workpiece in the coordinate system of detecting and scanning actuator into the point cloud data of the workpiece in the coordinate system of machine tool.

Specifically, since the coordinate system of detection device and the coordinate system of machine tool are different, it is necessary to convert the coordinate system and calibrate the parameters (parameter calibration is to position the detection mechanism and the workpiece to be processed relative to the absolute coordinate system of the machine tool after each clamping, and the calibrated rotation angle information will ensure that the detection starts at the real zero position).

Figure 2:
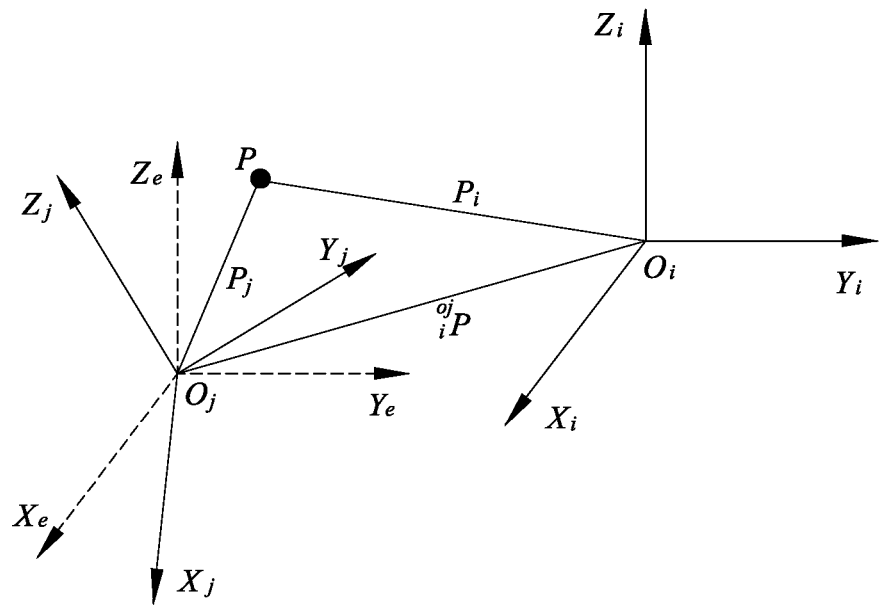
FIG. 2 is a schematic diagram of the coordinate system of the detecting and scanning actuator and the coordinate system of the machine tool in the present application.

As shown in FIG. 2, the coordinate system of detecting and scanning actuator can be converted into the coordinate system of machine tool according to equation (1):

$$P_e = {}^j_i R P_j$$

$$P_i = P_e + {}^{oj}_i P = {}^j_i R P_j + {}^{oj}_i P \quad (1),$$

Wherein, $P_i$ represents the coordinate system of machine tool, $P_j$ represents the coordinate system of detecting and scanning actuator, ${}^{oj}_i P$ represents the relative translation position of the three axes between the origin of the coordinate system of the detecting and scanning actuator and that of the machine tool, ${}^j_i R$ is the rotation matrix, which represents the rotation amount of the coordinate system of the detecting and scanning actuator relative to the initial position, and $p_j$ represents the transposition of the coordinates of the known point P in the coordinate system of the detecting and scanning actuator ($p_j$ refers to the point cloud data obtained by the detecting scanner, the coordinates of known point P in the coordinate system of machine tool can be obtained by substituting $p_j$ into equation (1). This is because the machine tool needs to send control commands based on its own coordinate system, it is necessary to convert the data obtained based on the coordinate system of the detecting and scanning actuator into the available parameters of the machine tool).

It can be seen from equation (1) that the coordinate system transformation is actually rotation first and then translation. The $X_e$, $Y_e$ and $Z_e$ axes in FIG. 2 represent the coordinate systems that rotates the point cloud data first.

As the shape of the chuck 3 is circular and the position of it is fixed, the chuck 3 is scanned and detected by means of the detecting and scanning actuator and the angle information of the chuck rotation is then calibrated by rotating the chuck according to the obtained point cloud data of the chuck. In this embodiment, the chuck is circular and the rotation information cannot be recognized, a convex calibration part 30 is installed on the edge of the chuck 3, so that the rotation information of the chuck can be judged from the point cloud data generated by scanning to cooperate with the calibration.

Step S3, processing the point cloud data of the workpiece in the coordinate system of machine tool, which comprises:

Step S31, removing the external large number of noise points from the point cloud data of the workpiece in the coordinate system of machine tool by means of a main point cloud cluster extraction method, so as to obtain an original point cloud data of a blade model;

Step S32, removing the original data noise points from the original point cloud data of the blade model by means of statistical outlier method, so as to obtain denoised point cloud data;

Step S33, simplifying and smoothing the denoised point cloud data by means of bounding box method considering curvature.

Specifically, the original point cloud data of the workpiece in the coordinate system of machine tool obtained in S2 is recorded as the original point cloud data $P_i = \{x_i, y_i, z_i\}$. Due to the influence of the accuracy of the measuring equipment, scanning speed, the surface quality of the measured parts, the external environment and other factors, the noise points is inevitable to be introduced into the point cloud data. The existence of these noise points will directly affect the accuracy of the measured workpiece. Therefore, the original point cloud data $P_i$ needs to be denoised.

First of all, the original point cloud data $P_i$ needs to be rough processed. The original point cloud data of the blade model is obtained and the external large number of noise points are removed by means of main point cloud cluster extraction method.

Figure 3:
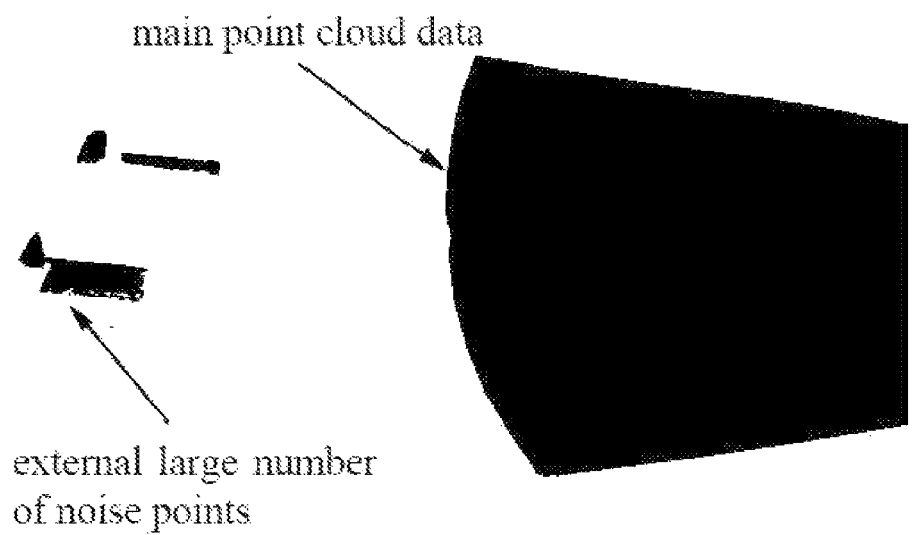
FIG. 3 is a schematic diagram of the original point cloud data in the present application.

As shown in FIG. 3, when the number of external unconnected noise points of the blade point cloud model is large, the main point cloud cluster extraction method is introduced. First, the point cloud is clustered according to density, wherein the point cloud with highest density is the main point cloud data of the blade, which is recorded as MP, the point cloud with low density is recorded as $OP_i$. The distance from $OP_i$ to MP is calculated according to equation (2), if the distance exceeds a predetermined threshold $D_\tau$, it means $OP_i$ is the external noise point to be deleted;

$$Dist(OP_i, MP) = \|OP_i - MP\| \quad (2).$$

Then, the fine process is carried out. The original data noise points are removed completely by means of statistical outlier method, i.e., the neighborhood of each point is analyzed by means of statistical method, which includes: first, the average distance $d_{mid}(P_i)$ of distances from the point $P_i$ to all points of neighborhood M is calculated according to equation (3), the global average distance $D_{mid}$ of model agrees with the Gaussian distribution $D \sim N(\mu, \sigma^2)$, whose characteristics are determined by mean value $\mu$ and standard deviation $\sigma$. If $d_{min}(P_i) > D_{mid}$, the point $P_i$ is defined as an outlier, and finally the outlier is deleted;

$$d_{mid}(P_i) = \frac{1}{k}\sum_{j=1}^{k} \|P_i - M_j\|, \quad (3)$$

Wherein k is the number of point cloud in neighborhood M of point $P_i$, $M_j$ is the j-th point in neighborhood M.

At last, the purpose of simplifying and smoothing is to remove the redundant data and make the point cloud data smoother while maintaining the curvature characteristics of the workpieces. Thus, the bounding box method considering curvature is introduced in the present application, the idea of the bounding box method is to put the denoised point cloud data into a cuboid and divide the cuboid into cubes with equal edges according to the predetermined simplification rate, for each cube, the point cloud data closest to the center of the cube is selected as the feature point. However, this method is easy to cause feature lost in the point cloud data with large curvature (K>0.33), especially for the point cloud data of high curvature of the aviation blade edge. Therefore, the curvature characteristics are considered in the present application, for areas with high curvature, the edge length of the cube is reduced to increase its density. The curvature is calculated by means of conicoid fitting method, i.e., fitting the quadric surface f(x, y) of K adjacent points at any one point of the point cloud according to equation (4), the curvature of $P_i$ is determined by means of calculating the main curvature and main direction of f(x, y). The first and second partial deviations are solved according to the knowledge of differential geometry, which are: $f_x$, $f_y$, $f_{xx}$, $f_{xy}$, $f_{yy}$; and the average curvature $K_{P_i}$ of the point $P_i$ can be calculated by equation (5):

$$f(x, y) = ax^2 + bxy + cy^2, \quad (4)$$

$$K_{P_i} = \frac{f_x f_x f_{yy} - 2 f_x f_y f_{xy} + f_y f_y f_{xx}}{2(f_x f_x f_{yy} - f_x^2 f_y^2)} \cdot \vec{n}, \quad (5)$$

Wherein $\vec{n}$ is the unit normal vector of the point $P_i$, which can be calculated as follows:

$$\vec{n} = \frac{f_x \times f_y}{|f_x \times f_y|}$$

Figure 4:
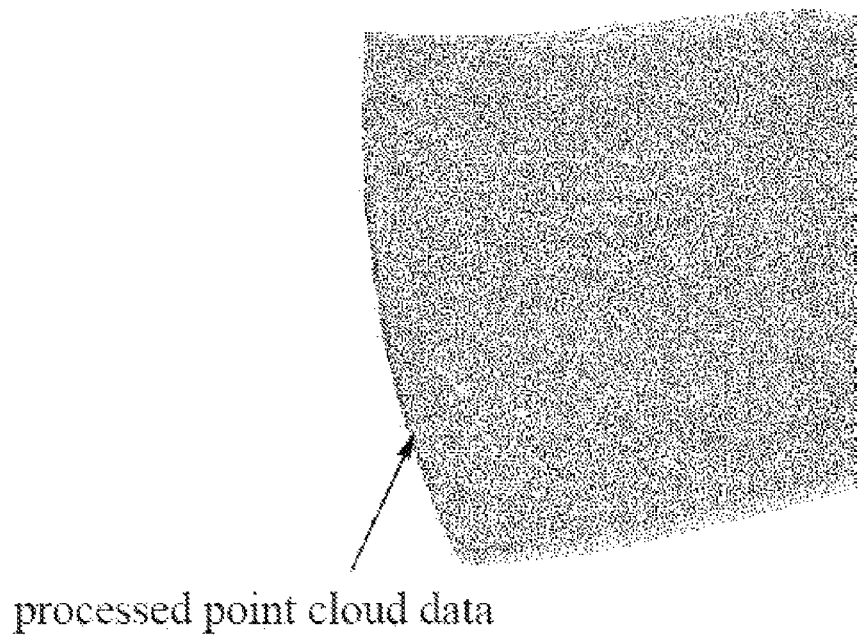
FIG. 4 is a schematic diagram of the point cloud data processed in Step S3 of the present application.

The point cloud data obtained through the above Step S3 is shown in FIG. 4, it can be seen from FIG. 4 that the processed point cloud data can still maintain the key features of the blade, especially the most important edge features for surface strengthening.

Step S4, obtaining and compensating the shape error feature of the workpiece according to the theoretical design data of the processed workpiece and the processed point cloud data of the workpiece in the coordinate system of machine tool.

Figure 5:
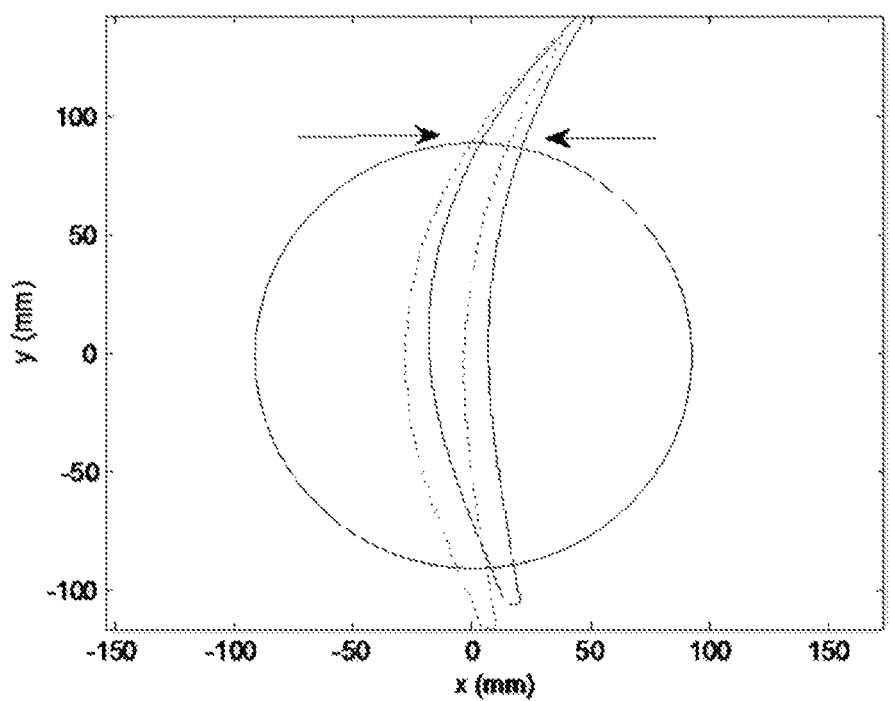
FIG. 5 is a schematic diagram of the error characteristic analysis on the X-Y plane of a certain processing section of the blade in the present application.

Specifically, taking the aircraft blade as an example, the strengthening process of the aircraft blade does not change the blade size or surface, nor can it correct the errors. Therefore, the errors in the strengthening process of the blade mainly refer to the errors between the theoretical position of the blade and the actual position of the blade on the machine tool, the former is obtained according to the design model of the blade, and the latter is obtained after the on-line detection point cloud data is processed. Then, the above errors can be obtained by analysis. The typical errors are shown in FIG. 5, which is the schematic diagram of a certain section of blade in X-Y plane, wherein the circle represents the position of the chuck 3, which can reflect the center position of the machine tool. The arrows represent the machining heads 6 on both sides of the blade, the solid lines represent the section position according to the blade design model, and the dotted lines represent the actual section position of the blade. It can be seen from FIG. 5 that on a certain processing section, due to the manufacturing errors of the machine tool and blade, the section may have errors in X direction, Y direction and rotation direction at the same time, and the shape and size of the section will be different. For the ultrasonic rolling strengthening of blade, both sides of each processing section need to be processed at the same time, and to the designated section area. The various errors shown in FIG. 5 will eventually lead to the following results: on one hand, the contact position between the left and right machining heads 6 and the blade section is wrong; on the other hand, the upper ends of the machining heads 6 on both sides exceeds the blade section area in the Y direction, and the lower end cannot reach the lowest position.

Figure 6:
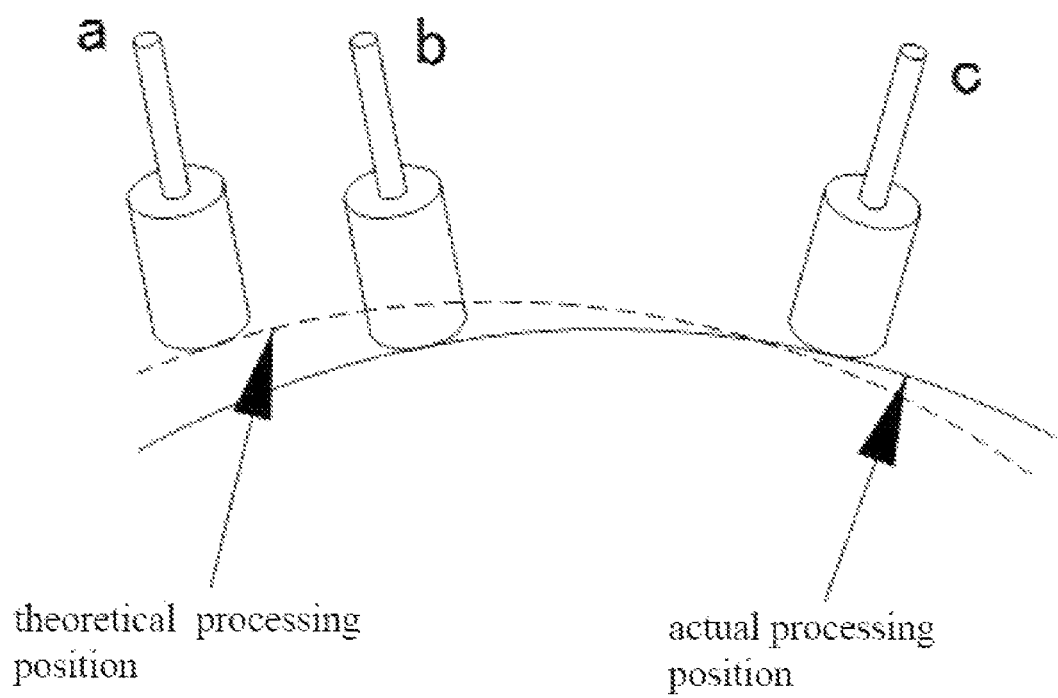
FIG. 6 is a schematic diagram for compensating the error in the X direction by using the force feedback compensation method in the present application.

Therefore, the present application analyzes the maximum deviation values in X direction and Y direction between the point cloud data of the workpiece after processed (i.e., the actual position data on X and Y axes of each layer of section of the processed workpiece 2) and the theoretical design data of the processed workpiece (i.e., the design position data on X and Y axes of each layer of section of the processed workpiece 2) and take it as the error feature, and the error in the X direction are compensated by means of force feedback compensation method, and the error in the Y direction is compensated by means of increasing the trajectory deviation value (in the embodiment of the present application, the actual trajectory refers to the trajectory that needs to be processed (i.e., the data composed of scanned and processed point clouds), and the theoretical trajectory refers to the data given by the three-dimensional model, the trajectory deviation value here refers to an adjustment value given to the machine tool, the machine tool can move from the theoretical trajectory to the actual trajectory by increasing the adjustment value) (i.e., the trajectory deviation value of the machining heads 6 in the Y direction can be increased or decreased by adjusting the processing trajectory of the ultrasonic rolling processing trajectory during the strengthening process). Specifically, because of the error in the X direction, the pre-pressures of the machining heads 6 on both sides and that on the surface of the workpiece are different (when the machining heads 6 are pressed against on the surface of the workpiece, the pre-pressure will be generated), the expansion and contraction of the internal springs of the machining heads 6 can be adjusted by the force sensors installed on the machining heads 6 according to the real-time change of the pre-pressure, so that the pre-pressure between the machining heads 6 and the surface of the workpiece can be adjusted to make it constant, and then the error in the X direction can be compensated. For example, as shown in FIG. 6, the solid lines represent the actual position of the surface of the blade, the dotted lines represent the theoretical positon of the surface of the blade, when processing, the machining heads 6 going along with the dotted lines according to the theoretical value need to be adjusted to the position of solid lines of the actual blade. In FIG. 6, a shows that the machining head 6 is processed according to the theoretical dotted line, so it is separated from the machining surface, which means the pre-pressure is too small; b shows that the position of the machining head 6 after compensation has been fitted to the actual blade surface; c shows that the machining head 6 can always fit the blade after compensation, if this position is not compensated, the pre-pressure will be too large. In addition, according to the actual processing requirements and experience, the influence of the error in the rotation direction of Z axis of the workpiece is small. Of course, the method of increasing the trajectory deviation value can also be used to compensate the error in the Z direction. It should be noted that the strengthening process is stopped in the process of detecting and scanning, and the trajectory of the strengthening process is adjusted to achieve the purpose of error compensation by means of analyzing the processed model of the point cloud data obtained from the scanning and the workpiece design model.

In summary, the design scheme of on-machine detection proposed by the present application can be designed according to the structural characteristics of the ultrasonic rolling machine tool, which simplifies the design difficulty of the scanning actuator. After comprehensive analysis and comparison of several different scanners, the selected laser scanner has the advantages of good point cloud acquisition effect, low cost and appropriate size. The proposed equipment calibration method is simple, practical and feasible. The proposed processing method of large-scale complex surface point cloud is the key to accurately obtain surface errors and later compensation. According to the feature of surface strengthening of complex surface, the errors are analyzed from the final result, which simplifies the difficulty of feature analysis. The proposed error compensation scheme complies with the actual situation of surface strengthening of complex surface. The on-machine point cloud detection and compensation method for processing complex surfaces uses advanced non-contact fast shape detection technology, compared with conventional detection methods, it has the characteristics of free disassembly and assembly, fast speed and high accuracy, and has strong technical advancement and innovation. At the same time, the large-scale point cloud processing technology of complex surface studied in the present application is more challenging than the point cloud processing problem of general workpieces; which is mainly reflected in that the surface shapes are irregular the shape curvature changes greatly, high precision is required, and the amount of calculation is large. Therefore, it is difficult to study. In addition, the main point cloud clustering extraction method and statistical outlier method are used to remove noise, the bounding box method considering curvature is used to simplify and smooth, which have distinct characteristics.

What is claimed is:

1. An on-machine point cloud detection and compensation method for processing complex surfaces, wherein comprising following steps:
    Step S1, installing a detecting and scanning actuator on an ultrasonic rolling machine tool, wherein, the ultrasonic rolling machine tool comprises: a chuck and two machining heads respectively installed on left and right sides of the chuck; the detecting and scanning actuator comprises two detecting scanners respectively installed on the machining heads;
    Step S2, scanning a processed workpiece installed on the chuck by the detecting and scanning actuator to obtain point cloud data of the workpiece in a coordinate system of detecting and scanning actuator, and converting the point cloud data of the workpiece in the coordinate system of detecting and scanning actuator into the point cloud data of the workpiece in a coordinate system of machine tool;
    Step S3: processing the point cloud data of the workpiece in the coordinate system of machine tool;
    Step S4: obtaining and compensating shape error feature of the workpiece according to theoretical design data of the processed workpiece and processed point cloud data of the workpiece in the coordinate system of machine tool;
    Wherein, the Step S3 comprises:
    Step S31, removing external noise points from the point cloud data of the workpiece in the coordinate system of machine tool by means of a main point cloud cluster extraction method, so as to obtain an original point cloud data of a blade model;
    Step S32, removing original data noise points from the original point cloud data of the blade model by means of statistical outlier method so as to obtain denoised point cloud data;
    Step S33, simplifying and smoothing the denoised point cloud data by means of bounding box method considering curvature.

2. The on-machine point cloud detection and compensation method for processing complex surfaces according to claim 1, the Step S31 comprises:
    clustering the point cloud data of the workpiece in the coordinate system of machine tool according to density, wherein point cloud with highest density is main point cloud data of blade, which is recorded as MP, point cloud with low density is recorded as $OP_i$, distance from $OP_i$ to MP is calculated according to following equation, if the distance exceeds a predetermined threshold$D_\tau$, it means $OP_i$ is the external noise point to be deleted;

$$\text{Dist}(OP_i, MP) = \|OP_i - MP\| \quad (2).$$

3. The on-machine point cloud detection and compensation method for processing complex surfaces according to claim 1, wherein the Step S32 comprises:
    calculating average distance $d_{mid}(P_i)$ of distances from each point $P_i$ of the original point cloud of the blade model to all points of neighborhood M according to following equation, if $d_{mid}(P_i) > D_{mid}$, point $P_i$ is defined as an outlier, and finally the outlier is deleted, wherein $D_{mid}$ is global average distance of model;

$$d_{mid}(P_i) = \frac{1}{k}\sum_{j=1}^{k}\|P_i - M_j\|,$$

wherein k is number of point cloud in neighborhood M of point $P_i$, $M_j$ is point in neighborhood M.

4. The on-machine point cloud detection and compensation method for processing complex surfaces according to claim 1, wherein the Step S33 comprises: putting the denoised point cloud data into a cuboid, dividing the cuboid evenly into cubes with equal edges according to a predetermined simplification rate; for each cube, selecting the point cloud data closest to center of the cube as feature point, and reducing edge length of the cube to increase its density for areas with curvature greater than 0.33 in the denoised point cloud data.

5. The on-machine point cloud detection and compensation method for processing complex surfaces according to claim 4, wherein the Step S33 also comprises: calculating curvature of the denoised point cloud data by means of conicoid fitting method.

6. The on-machine point cloud detection and compensation method for processing complex surfaces according to claim 1, wherein the shape error feature of the workpiece comprises: maximum deviation values in X and Y directions between actual position data on X axis and Y axis of each layer of section of the processed workpiece and design position data on X axis and Y axis of each layer of section of the processed workpiece, the Step S4 comprises: compensating the maximum deviation value in X direction by means of force feedback compensation method, and compensating the maximum deviation value in Y direction by means of increasing or decreasing trajectory offset of the machining heads in Y direction.

7. The on-machine point cloud detection and compensation method for processing complex surfaces according to claim 1, wherein the ultrasonic rolling machine tool also comprises: a bed base, the chuck can rotate around Z axis and be movably mounted on the bed base along Z axis.

8. The on-machine point cloud detection and compensation method for processing complex surfaces according to claim 1, wherein the detecting and scanning actuator also comprises: two Y axis lifting mobile worktables installed on the bed base and symmetrically distributed on left and right sides of the processed workpiece, and two X axis left and right mobile worktables respectively installed on the Y axis lifting mobile worktables.

9. The on-machine point cloud detection and compensation method for processing complex surfaces according to claim 1, wherein the detecting scanner is a laser scanner.

* * * * *